US010540770B2

(12) United States Patent
Jang et al.

(10) Patent No.: US 10,540,770 B2
(45) Date of Patent: Jan. 21, 2020

(54) METHOD AND APPARATUS FOR FULLY AUTOMATED SEGMENTATION OF JOINT USING PATIENT-SPECIFIC OPTIMAL THRESHOLDING AND WATERSHED ALGORITHM

(71) Applicant: Korea Advanced Institute of Science and Technology, Daejeon (KR)

(72) Inventors: InGwun Jang, Daejeon (KR); Jung Jin Kim, Daejeon (KR); Ji Min Nam, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 186 days.

(21) Appl. No.: 15/860,398

(22) Filed: Jan. 2, 2018

(65) Prior Publication Data
US 2019/0087960 A1    Mar. 21, 2019

(30) Foreign Application Priority Data

Sep. 15, 2017   (KR) ........................ 10-2017-0118523

(51) Int. Cl.
*G06K 9/00* (2006.01)
*A61B 6/00* (2006.01)
(Continued)

(52) U.S. Cl.
CPC .............. *G06T 7/11* (2017.01); *G06T 7/136* (2017.01); *G06T 7/155* (2017.01);
(Continued)

(58) Field of Classification Search
USPC ........ 382/100, 103, 106–107, 128–133, 154, 382/162, 172–173, 181, 199, 219, 224,
(Continued)

(56) References Cited

U.S. PATENT DOCUMENTS

| 2007/0116357 A1* | 5/2007 | Dewaele ............... G06K 9/3233 |
| | | 382/173 |
| 2015/0078641 A1* | 3/2015 | Tan ........................... G06T 7/12 |
| | | 382/131 |
| 2016/0093096 A1* | 3/2016 | Ouji ...................... G06K 9/4604 |
| | | 382/131 |
| 2017/0032518 A1* | 2/2017 | Behrooz .................. G06K 9/52 |

FOREIGN PATENT DOCUMENTS

| EP | 1 978 485 A1 | 10/2008 |
| KR | 100283072 | 3/2001 |

(Continued)

OTHER PUBLICATIONS

Bieniecki, "Oversegmentation Avoidance in Watershed-Based Algorithms for Color Images", Modern Problems of Radio Engineering, Telecommunications and Computer Science, 2004, Proceedings of the International Conference LVIV-Slaysko, Ukraine Feb. 24-28, 2004, IEEE, Feb. 28, 2004, pp. 169-172.
(Continued)

*Primary Examiner* — Seyed H Azarian
(74) *Attorney, Agent, or Firm* — Blank Rome LLP

(57) ABSTRACT

Disclosed are a method and apparatus for fully automatically segmenting a joint based on a patient-specific optimal thresholding method and a watershed algorithm. The method of fully automatically segmenting an image may include the steps of extracting region information corresponding to a target object to be segmented from a medical image of the target object by associating a thresholding method and a load path algorithm, generating a first mask MASK 1 based on the extracted region information, generating a morphological patch by performing morphological subdivision on the medical image based on a watershed algorithm, generating a second mask MASK 2 based on the generated morphological patch, and segmenting an image corresponding to the target object from the medical image based on the first mask and the second mask.

24 Claims, 8 Drawing Sheets

(51) Int. Cl.
*G06T 7/11* (2017.01)
*G06T 7/136* (2017.01)
*G06T 7/155* (2017.01)

(52) U.S. Cl.
CPC ............... *G06T 2207/10081* (2013.01); *G06T 2207/10088* (2013.01); *G06T 2207/20008* (2013.01); *G06T 2207/20032* (2013.01); *G06T 2207/20036* (2013.01); *G06T 2207/20044* (2013.01); *G06T 2207/20152* (2013.01); *G06T 2207/30008* (2013.01)

(58) Field of Classification Search
USPC ....... 382/232, 254, 274, 276, 286–291, 305, 382/312; 1/1; 378/4, 21, 28
See application file for complete search history.

(56) References Cited

FOREIGN PATENT DOCUMENTS

| KR | 10-2017-0000040 A | 1/2017 |
|---|---|---|
| KR | 10-2017-0058698 | 5/2017 |

OTHER PUBLICATIONS

Belkasim et al., "New Methods for Contour Detection and Automatic Thresholding", Canadian Journal of Electrical and Computer Engineering, vol. 20, No. 4, Dec. 1, 1995, pp. 165-171.

* cited by examiner

FIG. 4

| | Flagging array (410) | | Regional patch (420) | |
|---|---|---|---|---|
| | $A_{femur}(i,j,k)$ (411) | $A_{pelvis}(i,j,k)$ (412) | $P_1(femur)$ (421) | $P_1(pelvis)$ (421) |
| $TH < TH_{opt}$ | | | | |
| $TH = TH_{opt}$ | | | | |
| $TH > TH_{opt}$ | | | | |

Case 1   Case 2   Case 3   Case 4

METHOD AND APPARATUS FOR FULLY AUTOMATED SEGMENTATION OF JOINT USING PATIENT-SPECIFIC OPTIMAL THRESHOLDING AND WATERSHED ALGORITHM

CROSS REFERENCE TO RELATED APPLICATION

The present application claims the benefit of Korean Patent Application No. 10-2017-0118523 filed in the Korean Intellectual Property Office on Sep. 15, 2017, the entire contents of which are incorporated herein by reference.

BACKGROUND OF THE INVENTION

1. Technical Field

The present invention relates to a technology for automatically segmenting an image corresponding to a joint from a skeletal medial image.

2. Description of the Related Art

A joint is an important portion of the human body at which bones are connected, and acts as the axis for various types of exercises of the spine and the limbs to enable various exercises. However, when a bone forming a joint portion is fractured due to aging or osteoporosis, it makes difficult an independent movement and may lead to death in severe cases.

In particular, in accordance with data examined by "Health Insurance Review & Assessment Service", the death rate within one year after a hip joint fracture in people of over 50 years old in Korea was 14.8% in women and 20.9% in men, which are very high levels. Furthermore, due to the ageing society, the number of hip joint fracture patients steadily increases, and a corresponding social cost also greatly increases over 1 trillion won or more.

Active research is recently carried on a danger assessment technology regarding osteoporosis early diagnosis and osteoporosis fracture with the development of medical imaging devices, image processing schemes and medical engineering field. A method of assessing the bone strength of a patient in association with a 3D quantitative computed tomography image and finite element analysis has recently been in the spotlight by the academic world and medical system because the structural strength of a target skeletal system can be quantitatively estimated based on a bone density distribution of an individual patient. For the bone strength assessment based on finite element method (FEM), an image segmentation technology for segmenting only a joint portion from complicated medical image information formed of muscle, bones, etc. and configuring a finite element model must be secured.

Due to the morphological characteristics of a joint and the technological limit of a medical imaging device, automatic image segmentation for a joint portion is still in the early stage. In general, a joint has a low signal-to-noise ratio (SNR) because it is located in the deep place of the body. A thin cortical bone of the condyle and the articular cartilage are vulnerable to a partial volume effect according to low spatial resolution of an in-vivo medical imaging device. Due to such a problem, the existing joint image segmentation has been performed according to a manual or semi-automatic method that requires a user's intervention.

If an expert uses the corresponding technology, a joint image can be segmented, but there are problems, such as long working hours and different results according to users. Accordingly, a lot of search is recently carried out to develop a joint automation image segmentation method having high accuracy and reliability and a short processing time. The method of automatically segmenting an image is basically divided into an unsupervised approach and a supervised approach.

The unsupervised approach is a method of segmenting a joint using only an image processing scheme without prior information about a joint, and it has advantages of implementation convenience and a short processing time, but does not guarantee reliable joint segmentation. For example, the unsupervised approach includes a thresholding method, a region growing method and a watershed algorithm.

The thresholding method is a method of removing a predetermined threshold or less from an image and leaving a threshold or more in the image. This method consumes very little time and is the simplest method, but it is difficult to obtain region information of a shape because connectivity between segmented images is not guaranteed.

The region growing method is a method of gradually expanding to a region having a similar image element value using a seed point as a starting point. This method can provide region information of a shape because connectivity between segmented images is guaranteed, but it obtains erroneous results because an unwanted region is extended if a comparison between image elements is small.

The watershed algorithm is a method of binding morphologically similar regions in a patch form while filling an individual valley with water by considering an input image as a geographical structure. In this method, the morphological characteristics of a structure may be considered, but it is not easy to select a patch of a desired form without region information because this method tends to excessively segment an image.

The supervised approach is a method of automatically segmenting a joint using accumulated shape information of joints, but it is not easy to construct a plurality of pieces of image information because the results of segmentation depends on accumulated image information. Representative examples of the supervised approach include a statistical shape model-based method and an atlas-based method. The statistical shape model-based method is a method of statistically representing a target shape using a plurality of pieces of prior information, searching for the landmark of the target shape when a specific image is received, representing the image using a statistical model, and then performing image segmentation. In this method, image segmentation is relatively well performed if a target shape is similar to prior information, but image segmentation fails if an image different from prior information is received.

The atlas-based method is a method of constructing an atlas, that is, a plurality of shape models, by considering the size, direction and form of a target shape and using the atlas for image segmentation. This method is a method of selecting an atlas having the smallest error by comparing a specific input image with the existing atlas. The atlas-based method can obtain precise results for a predictable shape, but fails in image segmentation if there is an element that has not been previously considered.

Accordingly, there is a need for a technology for fully automatically segmenting an image of a joint portion from a skeletal medial image.

Korean Patent Publication No. 10-2017-0000040relates to a medical image segmentation apparatus and method based on user input that may be fed back, and discloses a technology for generating a 2D target segmentation image, including an interested region to be segmented and background region selected by a user, from a displayed 3D medical image and extending the 2D target segmentation image in the 3D manner.

SUMMARY OF THE INVENTION

Embodiments of the present invention propose the automatic segmentation of a joint image from a skeletal medial image using a mutual supplementation relation between unsupervised approaches with high accuracy and reliability and fast processing time.

A method of fully automatically segmenting an image may include the steps of extracting region information corresponding to a target object to be segmented from a medical image of the target object by associating a thresholding method and a load path algorithm, generating a first mask MASK 1 based on the extracted region information, generating a morphological patch by performing morphological subdivision on the medical image based on a watershed algorithm, generating a second mask MASK 2 based on the generated morphological patch, and segmenting an image corresponding to the target object from the medical image based on the first mask and the second mask.

In accordance with one aspect, the step of segmenting the image corresponding to the target object may include segmenting the image corresponding to the target object from the medical image by merging the first mask corresponding to a regional patch and the second mask corresponding to the morphological patch.

In accordance with another aspect, the step of extracting the region information corresponding to the target object may include the steps of performing thresholding on the medical image based on a predetermined threshold, extracting a flag array related to the target object from an image on which the thresholding has been performed based on the load path algorithm, and generating a regional patch corresponding to the target object based on the extracted flag array.

In accordance with yet another aspect, the step of performing the thresholding may include the steps of setting the threshold used upon performing the thresholding as a design variable of a golden section method and changing the threshold so that the threshold is relatively reduced according to the golden section method until predetermined convergence conditions are satisfied.

In accordance with yet another aspect, the step of generating the morphological patch may include generating the morphological patch on the medical image by performing preprocessing based on a middle value filter, dilation operation, and erosion operation.

In accordance with yet another aspect, the step of generating the morphological patch may include the steps of removing noise from the medical image based on a middle value filter, reinforcing a boundary of the image corresponding to the target object by performing dilation operation and erosion operation on an image from which the noise has been removed, and performing morphological subdivision on the image whose boundary has been enhanced based on the watershed algorithm.

In accordance with yet another aspect, the step of segmenting the image may include automatically segmenting the image corresponding to the target object by selectively extracting a patch corresponding to the first mask from the second mask.

In accordance with yet another aspect, the medical image indicates a quantitative computed tomography (QCT), computed tomography (CT) or magnetic resonance imaging (MRI) image. The step of segmenting the image may include segmenting an image corresponding to a hip joint from the QCT, CT or MRI image.

In accordance with yet another aspect, the step of segmenting the image may include segmenting images corresponding to different two bones forming the hip joint from the QCT, CT or MRI image.

An apparatus for fully automatically segmenting an image includes memory on which at least one program has been loaded and at least one processor. The at least one processor may process the processes of extracting region information corresponding to a target object to be segmented from a medical image of the target object by associating a thresholding method and a load path algorithm, generating a first mask MASK 1 based on the extracted region information, generating a morphological patch by performing morphological subdivision on the medical image based on a watershed algorithm, generating a second mask MASK 2 based on the generated morphological patch, and segmenting an image corresponding to the target object from the medical image based on the first mask and the second mask under a control of the program.

In accordance with one aspect, the process of segmenting the image corresponding to the target object may include segmenting the image corresponding to the target object from the medical image by merging the first mask corresponding to a regional patch and the second mask corresponding to the morphological patch.

In accordance with another aspect, the process of extracting the region information corresponding to the target object may include the processes of performing thresholding on the medical image based on a predetermined threshold, extracting a flag array related to the target object from an image on which the thresholding has been performed based on the load path algorithm, and generating a regional patch corresponding to the target object based on the extracted flag array.

In accordance with yet another aspect, the process of performing the thresholding may include the processes of setting the threshold used upon performing the thresholding as a design variable of a golden section method and changing the threshold so that the threshold is relatively reduced according to the golden section method until predetermined convergence conditions are satisfied.

In accordance with yet another aspect, the process of generating the morphological patch may include generating the morphological patch on the medical image by performing preprocessing based on a middle value filter, dilation operation, and erosion operation.

In accordance with yet another aspect, the process of generating the morphological patch may include the processes of removing noise from the medical image based on a middle value filter, reinforcing a boundary of the image corresponding to the target object by performing dilation operation and erosion operation on an image from which the noise has been removed, and performing morphological subdivision on the image whose boundary has been enhanced based on the watershed algorithm.

In accordance with yet another aspect, the process of segmenting the image may include automatically segmenting the image corresponding to the target object by selectively extracting a patch corresponding to the first mask from the second mask.

In accordance with yet another aspect, the medical image indicates a quantitative computed tomography (QCT), computed tomography (CT) or magnetic resonance imaging (MRI) image. The process of segmenting the image may include segmenting an image corresponding to a hip joint from the QCT, CT or MRI image.

In accordance with yet another aspect, the process of segmenting the image may include segmenting images corresponding to different two bones forming the hip joint from the QCT, CT or MRI image.

In accordance with yet another aspect, the process of segmenting the image may include selectively extracting any one of two or more bones from the second mask if the target object may include the two or more bones, and segmenting an image corresponding to the extracted bone from the medical image by performing merging based on a morphological patch corresponding to the extracted bone and a regional patch corresponding to the bone extracted from the first mask.

There is provided a computer-readable storage medium including an instruction which controls a computer system to provide fully automatic image segmentation. The instruction may control the computer system according to a method, including the steps of extracting region information corresponding to a target object to be segmented from a medical image of the target object by associating a thresholding method and a load path algorithm, generating a first mask MASK 1 based on the extracted region information, generating a morphological patch by performing morphological subdivision on the medical image based on a watershed algorithm, generating a second mask MASK 2 based on the generated morphological patch, and segmenting an image corresponding to the target object from the medical image based on the first mask and the second mask.

BRIEF DESCRIPTION OF THE DRAWINGS

FIG. 4 is a diagram showing a flag array and a regional patch in an embodiment of the present invention.

DETAILED DESCRIPTION

Figure 1:
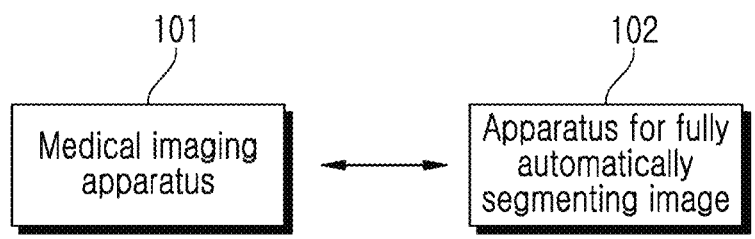
FIG. 1 is a diagram showing a schematic configuration of a medical imaging apparatus and an apparatus for fully automatically segmenting an image in an embodiment of the present invention.

Hereinafter, embodiments of the present invention are described in detail with reference to the accompanying drawings. However, the present invention is not restricted or limited by the embodiments. Furthermore, throughout the drawings, the same reference numerals indicate the same elements.

The present embodiments relate to a technology for segmenting an image corresponding to a joint from a medical image of a target object and, specifically, to a technology for fully automatically segmenting an image corresponding to a joint using a mutual supplementation relation between unsupervised approaches in a skeletal medical image. In particular, the present embodiments relate to a technology for automatically segmenting an image including a region corresponding to a joint in a skeletal medical image using a mutual supplementation relation (i.e., characteristics) between the thresholding method and watershed algorithm of unsupervised approaches. Furthermore, in the thresholding method, region information of a shape could not be obtained because connectivity is not guaranteed. In the present embodiments, however, region information of a shape (e.g., bones) can be secured (or extracted) while representing the connectivity of the shape by associating the thresholding method, a load path and a scheme capable of obtaining a threshold (e.g., a section method based on a specific ratio). Furthermore, the present embodiments relate to a technology for performing preprocessing based on a middle value filter, dilation operation and erosion operation before performing the watershed algorithm on a medical image in order to prevent the medical image from being excessively subdivided in the watershed algorithm.

For example, the section method based on a specific ratio may include a golden section method based on a gold ratio. In the following embodiments, an example in which the golden section method is used as a section method is described, but various section methods may be used in addition to the golden section method. For example, all of common methodologies capable of obtaining a threshold, such as a section method based on predetermined various ratios in addition to the golden ratio, may be used. A threshold used upon thresholding may be set as a design variable of a corresponding section method/methodology.

In the present embodiments, a "target object" indicates a shape to be segmented (or extracted) from a medical image captured by a medical imaging apparatus, and may indicate a bone or joint (e.g., hip joint) corresponding to a specific body portion, for example. In the following embodiments, an example in which a target object is a hip joint is described, but this is only an embodiment. A target object may indicate bones of various shapes to be extracted or segmented from a medical image in addition to a hip joint. For example, the wrist, ankle, knee, lumbar or temporomandibular joint may be set as a target object. That is, the method and apparatus for fully automatically segmenting an image according to embodiments of the present invention may be applied to the entire human body skeletal system and may be applied to all of medical systems using an imaging device.

In the present embodiments, "dilation operation" and "erosion operation" correspond to morphology operation, and may correspond to preprocessing processes performed prior to the separation of an image and image processing. Morphology is to analyze a geometric form of an image, and the dilation operation and the erosion operation may be used to analyze a geometric form of a medical image. The erosion operation may make disappeared objects of a small lump depending on the size of a filter and the number of times that the filter is used. The dilation operation may make disappeared small holes within an object depending on the size of a filter and the number of times that the filter is used. The dilation operation and the erosion operation may be implemented as functions. Implemented functions may be fetched, and preprocessing, such as dilation operation and erosion operation, may be performed on a medical image.

In the present embodiments, a method of segmenting an image corresponding to a femur or pelvis from a QCT image is described as an example, but this is an embodiment. An image corresponding to a desired portion (e.g., a femur or pelvis) may be segmented from a CT image or an MRI image in addition to a QCT image. That is, pixel or voxel data processing may be performed on a corresponding image.

FIG. 1 is a diagram showing a schematic configuration of a medical imaging apparatus and an apparatus for fully automatically segmenting an image in an embodiment of the present invention.

Referring to FIG. 1, the medical imaging apparatus 101 may be an apparatus for photographing a target object for osteoporosis diagnosis, bone density measurement and skeletal ultrastructure check.

In this case, the medical imaging apparatus 101 may include all of medical apparatuses for converting intensity of an image of a target object into elastic modulus. For example, the medical imaging apparatus 101 may include all of medical imaging devices capable of converting intensity of an image, such as CT, QCT or MRI, into elastic modulus. Furthermore, the target object is a specific body portion photographed for bone density measurement, and may include a femoral region, a hip joint, the wrist, the ankle, the knee, and the lumbar, for example.

As described above, the medical imaging apparatus 101 may photograph the target object. The photographed information may be transmitted to the apparatus 102 for fully automatically segmenting an image. The apparatus 102 for fully automatically segmenting an image may generate a medical image based on the received photographed information. For example, if a QCT photographing device photographs a target object, it may detect X-rays passing through the target object and transfer them to the apparatus 102 for fully automatically segmenting an image. The apparatus 102 for fully automatically segmenting an image may generate a medical image using the QCT image based on the received X rays. In addition, if the medical imaging apparatus 101 is CT, a CT image may be generated. If the medical imaging apparatus 101 is MRI, an MRI image may be generated. The generated CT image or MRI image may be transferred to the apparatus 102 for fully automatically segmenting an image.

Furthermore, the apparatus 102 for fully automatically segmenting an image may automatically segment an image corresponding to a joint from the medical image using a mutual supplementation relation between the thresholding method and the watershed algorithm. For example, the apparatus 102 for fully automatically segmenting an image may generate a first mask MASK 1 corresponding to a regional patch related to the medical image by associating the thresholding method, the load path algorithm and the golden section method. In this case, the regional patch may include region information of a shape because the load path algorithm is associated and used. Furthermore, the apparatus 102 for fully automatically segmenting an image may generate a second mask MASK 2 indicative of a morphological patch related to the medical image using preprocessing and the watershed algorithm. The apparatus 102 for fully automatically segmenting an image may segment a desired image corresponding to the target object from the medical image based on the generated first and second masks.

The apparatus 102 for fully automatically segmenting an image may be connected to the medical imaging apparatus 101 in a wired or wireless manner, and may have a form in which the apparatus 102 has been connected to the medical imaging apparatus 101 or medical image software in an add-on type. For example, a computer system or a workstation may be used as the apparatus 102 for fully automatically segmenting an image. Furthermore, if the apparatus 102 is associated with finite element method (FEM) software, extension to bone strength assessment or osteoporosis diagnosis software for a joint and patient-specific artificial joint design software may be possible.

Hereinafter, an operation of automatically segmenting an image corresponding to a target object (e.g., a joint) from a medical image using a mutual supplementation relation between unsupervised approaches, that is, a mutual supplementation relation between the thresholding method and the watershed algorithm is described with reference to FIGS. 2 and 3.

Figure 2:
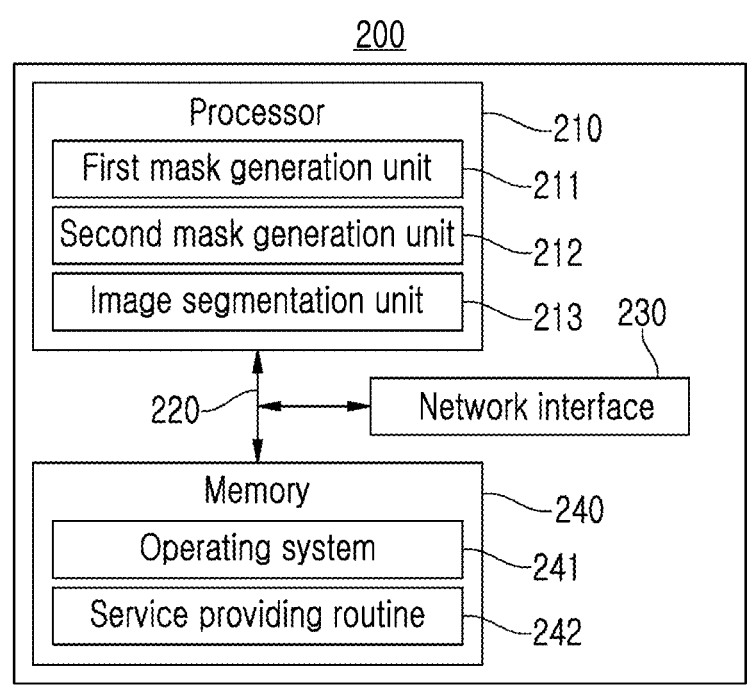
FIG. 2 is a block diagram for illustrating the internal configuration of the apparatus for fully automatically segmenting an image in an embodiment of the present invention.

FIG. 2 is a block diagram for illustrating the internal configuration of the apparatus for fully automatically segmenting an image in an embodiment of the present invention. FIG. 3 is a flowchart showing a method of fully automatically segmenting an image in an embodiment of the present invention.

The apparatus 200 for fully automatically segmenting an image according to the present embodiment may include a processor 210, a bus 220, a network interface 230 and memory 240. The memory 240 may include an operating system 241 and a service providing routine 242. The processor 210 may include a first mask generation unit 211, a second mask generation unit 212, and an image segmentation unit 213. In other embodiments, the apparatus 200 for fully automatically segmenting an image may include larger elements than those of FIG. 2. However, most of conventional technical elements do not need to be clearly shown. For example, the apparatus 200 for fully automatically segmenting an image may include other elements, such as a display or a transceiver.

The memory 240 is a computer-readable recording medium and may include permanent mass storage devices, such as random access memory (RAM), read only memory (ROM) and a disk drive. Furthermore, the memory 240 may store program code for the operating system 241 and the service providing routine 242. Such software elements may be loaded from a computer-readable recording medium different from the memory 240 using a drive mechanism (not shown). Such a separate computer-readable recording medium may include computer-readable recording media (not shown), such as a floppy drive, a disk, a tape, a DVD/CD-ROM drive and a memory card. In other embodiments, the software elements may be loaded onto the memory 240 through the network interface 230 other than the computer-readable recording media.

The bus 220 may enable communication and data transmission between the elements of the apparatus 200 for fully automatically segmenting an image. The bus 220 may be configured using a high-speed serial bus, a parallel bus, a storage area network (SAN) and/or other proper communication technologies.

The network interface 230 may be a computer hardware element for connecting the apparatus 200 for fully automatically segmenting an image to a computer network. The network interface 230 may connect the apparatus 200 for fully automatically segmenting an image to a computer network through a wireless or wired connection.

The processor 210 may be configured to process the instruction of a computer program by performing basic arithmetic and logic and the input/output operation of the apparatus 200 for fully automatically segmenting an image. The instruction may be provided from the memory 240 or the network interface 230 to the processor 210 through the bus 220. The processor 210 may be configured to execute program code for the first mask generation unit 211, the second mask generation unit 212 and the image segmentation unit 213. The program code may be stored in a recording device, such as the memory 240.

Figure 3:
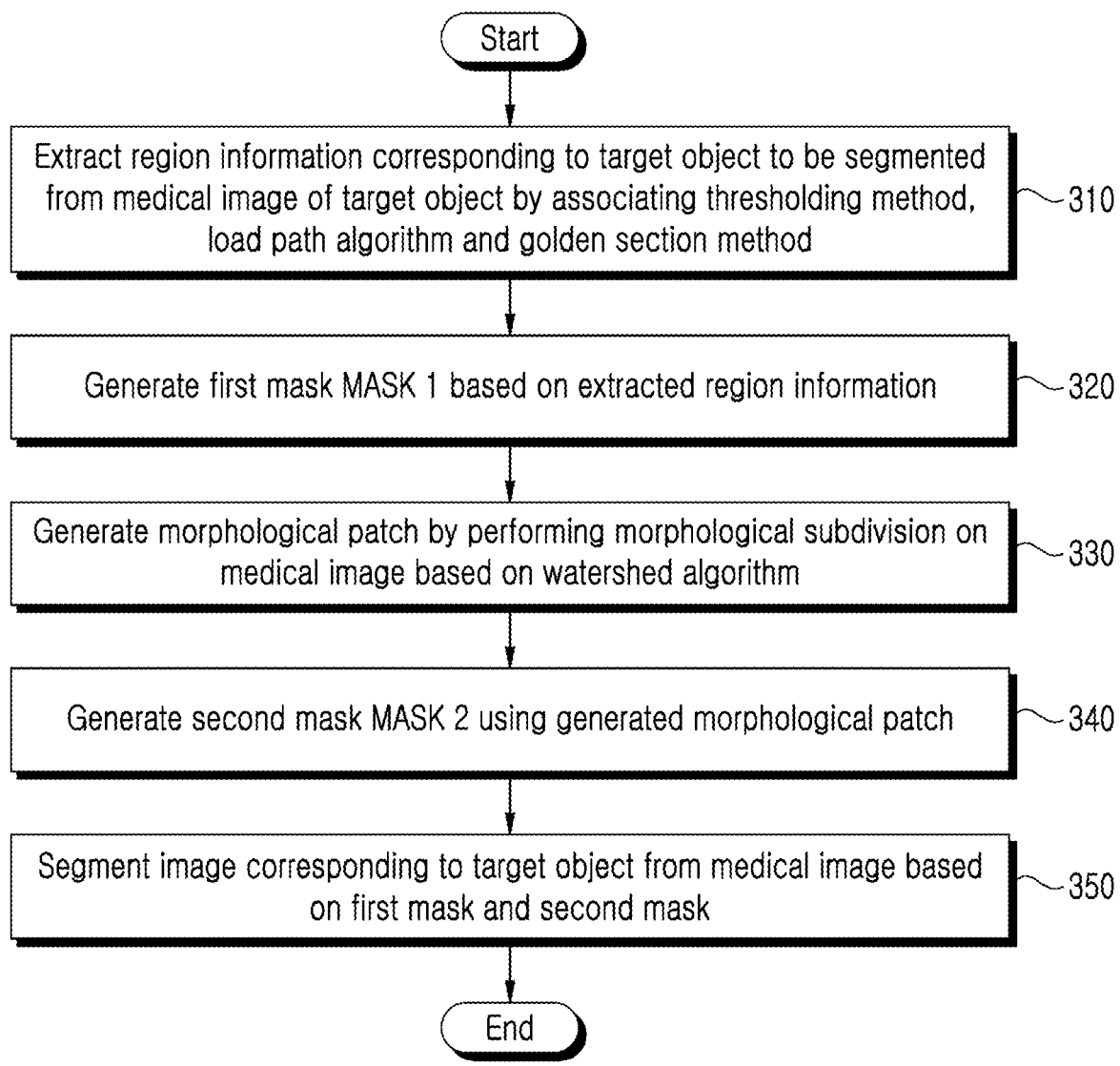
FIG. 3 is a flowchart showing a method of fully automatically segmenting an image in an embodiment of the present invention.

The first mask generation unit 211, the second mask generation unit 212 and the image segmentation unit 213 may be configured to perform the steps 310 to 350 of FIG. 3.

At step 310, the first mask generation unit 211 may extract region information corresponding to a target object to be segmented from a medical image of the target object by associating the thresholding method, the load path algorithm and the golden section method.

At step 311, the first mask generation unit 211 may perform thresholding on the medical image based on a predetermined threshold. For example, the first mask generation unit 211 may remove each element (e.g., set to 0) if the value of each element forming the medical image is the threshold or less, and may maintain each element (e.g., set to 1) if the value of each element forming the medical image is greater than the threshold. In this case, the value of each element may indicate the value of a picture element. That is, the first mask generation unit 211 may remove picture elements that form the medical image and that include picture elements (i.e., pixels), each one having the threshold or less, and may leave picture elements having values greater than the threshold in the medical image.

In this case, in the step prior to the extraction of a flag array, the first mask generation unit 211 may repeatedly change (or adjust) a threshold used when performing thresholding on the medical image in association with the golden section method. For example, the first mask generation unit 211 may set a threshold used when upon performing the thresholding as a design variable of the golden section method. The golden section method is a method of searching for the best point of a single variable function and can repeatedly reduce a search interval using a golden ratio.

At step 312, the first mask generation unit 211 may extract a flag array related to the target object (e.g., hip joint) from the image on which the thresholding has been performed based on the load path algorithm. In this case, the flag array may indicate information about regions connected within the thresholded image. For example, the flag array may indicate whether hip joints included in the thresholded image are connected or separated.

At step 313, the first mask generation unit 211 may generate a regional patch corresponding to the target object based on the extracted flag array.

At step 320, the first mask generation unit 211 may generate a first mask MASK 1 based on the extracted region information. That is, the first mask generation unit 211 may generate the first mask based on the regional patch indicative of information about connected regions. In this case, a detailed operation of generating the first mask is described later with reference to FIG. 4.

At step 330, the second mask generation unit 212 may generate a morphological patch by performing morphological subdivision on the medical image based on the watershed algorithm.

In this case, the second mask generation unit 212 may perform preprocessing on the medical image by complexly using the middle value filter, dilation operation and erosion operation in order to prevent the excessive subdivision of a predetermined reference level or more when applying the watershed algorithm. Furthermore, the second mask generation unit 212 may generate the morphological patch by performing morphological subdivision on the image on which the preprocessing has been performed using the watershed algorithm.

At step 340, the second mask generation unit 212 may generate a second mask MASK 2 using the generated morphological patch.

At step 350, the image segmentation unit 213 may segment an image corresponding to the target object (i.e., the hip joint) from the medical image based on the first mask and the second mask. For example, the image segmentation unit 213 may fully automatically segment the image corresponding to the target object from the medical image by merging the first mask and second mask of the regional patch corresponding to the target object.

In this case, if a hip joint, that is, the target object, is formed of a plurality of separated bones (e.g., two bones), such as the femoral region and pelvis, the image segmentation unit 213 may selectively extract a morphological patch corresponding to any one of the plurality of bones from the second mask, and may segment an image of a desired region by merging the extracted morphological patch and the first mask. Furthermore, the image segmentation unit 213 may selectively extract a morphological patch corresponding to the other bond that has not been selected from the second mask, and may segment an image of a desired region by merging the extracted morphological patch and the first mask.

For example, the image segmentation unit 213 may segment an image corresponding to a femoral region from the medical image by selectively extracting only a patch, including a region $P_1$(bone1) corresponding to the femoral region, from the second mask and merging the extracted patch and the first mask. Next, the image segmentation unit 213 may segment an image corresponding to the pelvis by selectively extracting only a patch, including a region corresponding to the pelvis, from the second mask and merging the extracted patch and the first mask. In this case, an example in which if the target object is formed of two bones, such as a hip joint, images of the femoral region and pelvis are segmented from the medical image by selectively extracting the two bones and merging them with the first mask has been described, but this is only an embodiment. Although the target object is formed of three or more bones, an image of a desired bone may be segmented from the medical image by extracting a morphological patch corresponding to each of the three or more bones and merging the morphological patch with the first mask. For example, a corresponding patch may be selectively selected from the second mask in random order of a plurality of bones or in order of bones that occupy the greatest or smallest region. In addition, a corresponding patch may be selectively selected from the second mask in the form of a combination of the methods. For example, a bone occupying the greatest region may be selected, an image related to the corresponding bone may be segmented, the remaining bones may be randomly selected, and image segmentation may be performed on the remaining bones. After any one bone is randomly selected and image segmentation related to the corresponding bone is performed, bones occupying the greatest region/smallest region in the second mask may be sequentially selected, and image segmentation may be performed on the selected bones.

FIG. 4 is a diagram showing a flag array and a regional patch in an embodiment of the present invention.

Referring to FIG. 4, in order to segment an image corresponding to a target object, such as a joint, from a medical image, it is necessary to primarily secure region information of bones forming the joint. In this case, the region information of the bones forming the corresponding joint may be statistically secured using data, or the region information may be secured without data by associating the thresholding method, the load path algorithm and the golden section method. The region information is information about connected regions and may indicate a flag array 410.

When thresholding (e.g., elements (i.e., picture elements) of the threshold or less are removed from the medical image) is performed on the medical image based on a predetermined threshold (TH), the first mask generation unit 211 may generate a flag array $A_{bone1}(i, j, k)$ 411 for a femur and a flag array $A_{bone2}(i, j, k)$ 412 for the pelvis using the load path algorithm with respect to the image on which thresholding has been performed (i.e., the medical image from which elements (i.e., picture elements) of the threshold or less have been removed). In this case, if a bone 1 is a femur and a bone 2 is a pelvis, $A_{bone1}(i, j, k)$ may be expressed as $A_{femur}(i, j, k)$, and $A_{bone2}(i, j, k)$ may be expressed as $A_{pelvis}(i, j, k)$.

Furthermore, the first mask generation unit 211 may generate a regional patch 420 using the flag array 410. For example, the first mask generation unit 211 may generate a regional patch 421 for the femur and a regional patch 422 for the pelvis.

In this case, as in FIG. 4, the flag arrays of the bones forming the hip joint may be connected or separated depending on the threshold TH of thresholding. That is, the flag array of the femoral region and the flag array of the pelvis may be connected or separated depending on whether the threshold is relatively high or low. In this case, if the threshold is relatively high, the two flag arrays may be separated in the state in which the external appearance of the hip joint has not been reserved. Accordingly, the first mask generation unit 211 may set the threshold of the thresholding as a design variable of the golden section method, and may search for the smallest threshold that separates the two bones (i.e., the femoral region and pelvis) forming the hip joint in the corresponding medical image. In this case, a method of searching for the smallest threshold that separates a plurality of bones may be expressed as a patient-specific optimal thresholding method in order to distinguish the method from a common thresholding method.

For example, the first mask generation unit 211 may repeatedly change or adjust the threshold so that the threshold is relatively reduced according to the golden section method until predetermined convergence conditions are satisfied. For example, the threshold of the thresholding may be set as a design variable of the golden section method based on Equation 1 below.

Minimize (threshold value)

Subject to $P_1(\text{femur}) \cap P_1(\text{pelvis}) = \emptyset$ [Equation 1]

In Equation 1, $P_1(\text{femur})$ may indicate a femoral region regional patch, and $P_1(\text{pelvis})$ may indicate a pelvis regional patch.

Furthermore, the first mask generation unit 211 may check whether the pelvis and the femur have been separated based on the load path algorithm, and may repeatedly perform thresholding based on a changed or adjusted threshold until the predetermined convergence conditions are satisfied while changing or adjusting the threshold according to the golden section method. Accordingly, the first mask generation unit 211 may extract the flag arrays $A_{bone1}(i, j, k)$ 411 and $A_{bone2}(i, j, k)$ 412, respectively corresponding to the femur and pelvis, from the image on which the thresholding has been performed based on the changed or adjusted threshold, and may generate the regional patches 421 and 422 corresponding to the femur and pelvis, respectively, based on the flag arrays. Furthermore, the first mask generation unit 211 may generate the first mask MASK 1 $P_{Mask1}$ as the generated regional patch according to Equation 2.

$P_{Mask1} = \{(x,y,x) | (x,y,z) \in P_1(\text{femur}) \cup P_1(\text{pelvis}) \cup P_1(\text{non-bone})\}$ [Equation 2]

In Equation 2, $P_1(\text{femur})$ may indicate a femoral region regional patch, and $P_1(\text{pelvis})$ may indicate a pelvis regional patch. Furthermore, $P_1(\text{no-bone})$ may indicate an uninterested region in the image on which the thresholding has been performed. For example, if an image related to a bone (i.e., hard tissue), such as the femoral region or pelvis, is to be extracted, a region related to the bone (hard tissue) in an image on which thresholding has been performed may correspond to an interested region, and the remaining regions other than the interested region (i.e., the region corresponding to the bone) in the image on which the thresholding has been performed may correspond to an uninterested region. For example, a region in which an object (e.g., muscle (i.e., soft tissue) or fat) other than the bone (hard tissue) is present and a region in which nothing is present are uninterested regions, and may correspond to $P_1(\text{non-bone})$. In this case, if an interested region is muscle, a bone and fat may correspond to uninterested regions. If an interested region is fat, a bone and muscle may correspond to uninterested region.

Figure 5:
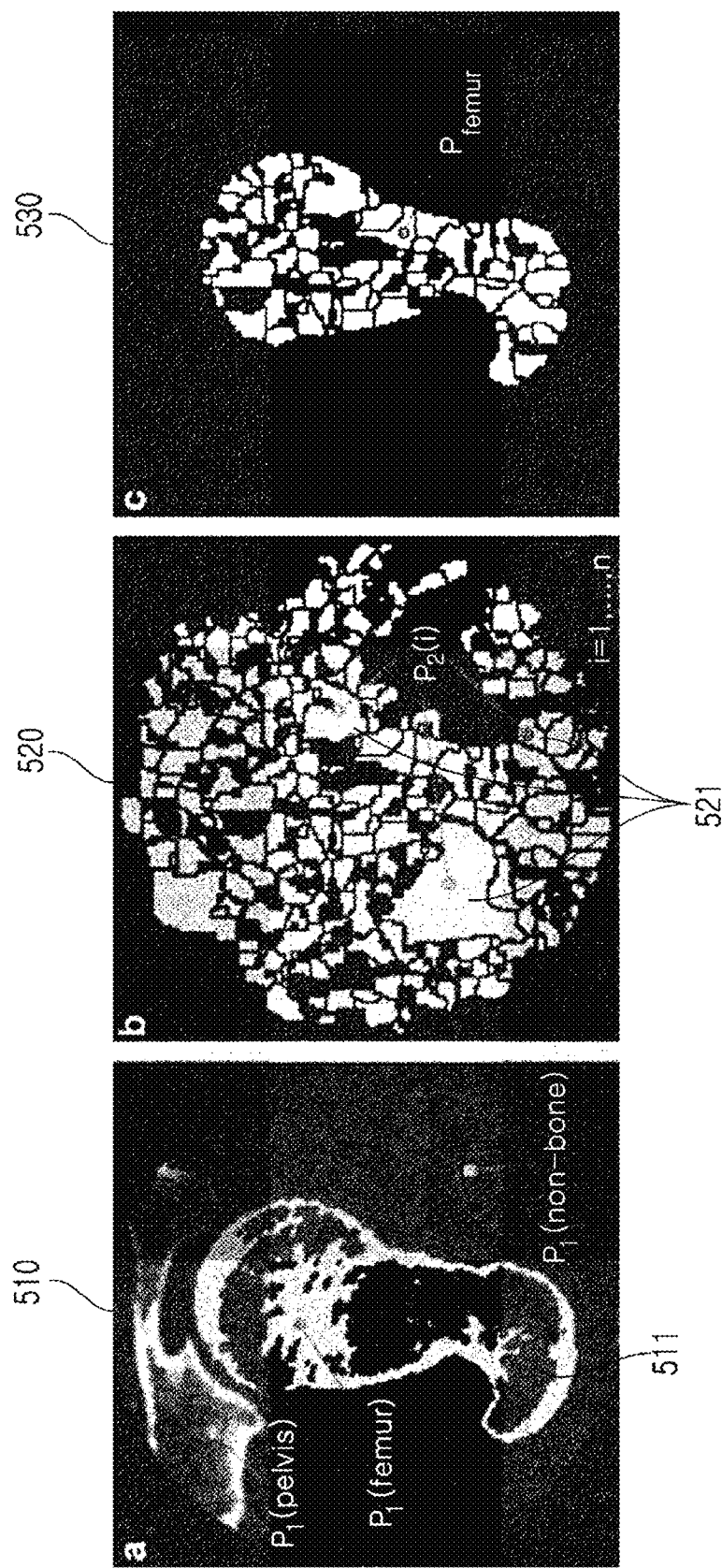
FIG. 5 is a diagram showing a femur image automatically segmented by merging a first mask and a second mask in an embodiment of the present invention.

FIG. 5 is a diagram showing a femur image automatically segmented by merging a first mask and a second mask in an embodiment of the present invention.

Referring to FIG. 5, 510 may indicate the first mask generated using the regional patch of the femur and the regional patch of the pelvis generated when the threshold is optimal. In this case, whether the pelvis and the femur have been separated or not may be checked based on the optimal threshold (i.e., $TH_{OPT}$ of FIG. 4) while changing or adjusting the threshold upon performing the thresholding. For example, the optimal threshold may be the smallest threshold (i.e., a first threshold) at which the pelvis and the femur are separated.

520 may indicate the second mask generated based on the watershed algorithm. In the watershed algorithm, an input image may be considered as a geographical structure, areas (i.e., regions) having similar pixel values may be patched to provide morphological information. In this case, if the watershed algorithm is applied to an image having an unclear boundary, erroneous morphological patch information generated by excessively subdividing the image may be provided. Accordingly, the second mask generation unit 212 may perform preprocessing on the medical image in order to prevent such excessive subdivision. For example, the second mask generation unit 212 may perform preprocessing based on the middle value filter, dilation operation and erosion operation.

For example, the second mask generation unit 212 may remove noise from the medical image using the middle value filter. Furthermore, the second mask generation unit 212 may reinforce the boundary of an image from which the noise has been removed by performing the dilation operation and erosion operation on the corresponding image. For example, the boundary of a hip joint image may be reinforced so that it becomes clear. If the boundary is reinforced as described above, the second mask generation unit 212 may perform morphological subdivision on the medical image based on the watershed algorithm and generate the second mask MASK 520 using the morphological patch generated by subdivision. For example, the second mask $P_{Mask2}$ may be generated based on Equation 3 below.

$$P_{Mask2} = \left\{ (x, y, z) \middle| (x, y, z) \in \bigcup_{i=1}^{n} P_2(i) \right\} \quad \text{[Equation 3]}$$

In Equation 3, n indicates the total number of divided patches. For example, a portion indicated by white in 520 of FIG. 5 may correspond to n divided patches.

530 may indicate a femur image automatically segmented from the medical image.

The first mask 510 generated based on Equation 2 and the second mask 520 generated based on Equation 3 have a mutual supplementation relation. Accordingly, the image segmentation unit 213 may successfully segment images corresponding to the two bones (i.e., the femur and pelvis) forming the hip joint by merging the first and the second masks 510 and 520.

For example, the region segmentation unit 213 may selectively extract a patch, corresponding to the region $P_1$(femur) to be extracted, from the second mask $P_{Mask2}$ 520 formed of the morphological patch. Furthermore, the region segmentation unit 213 may segment the femur image 530 from the medical image by merging the extracted patch and the first mask 510. In this case, the region segmentation unit 213 may selectively extract the patch of the region to be extracted, for example, the region $P_1$(femur) corresponding to the femur from the first mask 510. Furthermore, the region segmentation unit 213 may segment the femur image 530 by merging the paten 511 of the femur extracted from the first mask 510 and the patch 521 of the femur extracted from the second mask 520. For example, the region segmentation unit 213 may automatically segment the femur image 530 through the intersection of the patch 511 of the extracted femur and the patch 521 of the femur extracted from the second mask 520 based on Equation 4. Likewise, the region segmentation unit 213 may segment a pelvis image.

$$P_{femur} = \left\{ (x, y, z) \middle| (x, y, z) \in \bigcup_{i=1}^{n} (P_1(\text{femur}) \cap P_2(i)) \right\} \quad \text{[Equation 4]}$$

Figure 6:
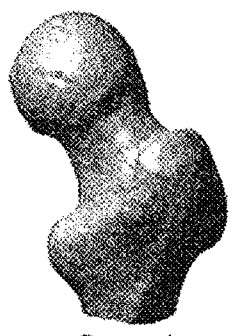
FIG. 6 is a diagram showing a femur image segmented from a QCT medical image in an embodiment of the present invention.
Figure 6:
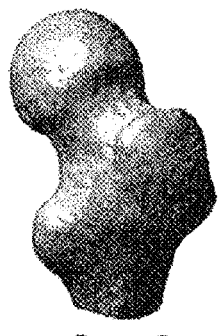
Figure 6:
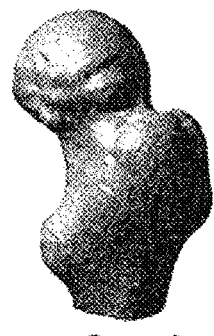
Figure 6:
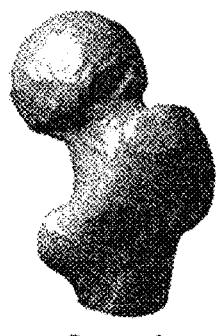

FIG. 6 is a diagram showing a femur image segmented from a QCT medical image in an embodiment of the present invention.

FIG. 6 may show segmented femur images segmented by applying the proposed technology to a QCT hip joint image in order to verify the validity of the method of segmenting an image corresponding to a target object using a mutual supplementation relation between the thresholding method and the watershed algorithm.

From FIG. 6, it may be seen that the femur images have been effectively segmented from the QCT hip joint image.

In FIG. 6, all of the four cases have not experience "metabolic bone disorders", and the cases 1 to 4 may be the same as Table 1.

TABLE 1

| Case | Sex | Age (y) | Resolution (μm) | # of slices |
|---|---|---|---|---|
| 1 | Female | 43 | 600 × 600 × 625 | 177 |
| 2 | Female | 62 | 600 × 600 × 625 | 169 |
| 3 | Female | 30 | 700 × 700 × 625 | 211 |
| 4 | Female | 53 | 700 × 700 × 625 | 219 |

Figure 7:
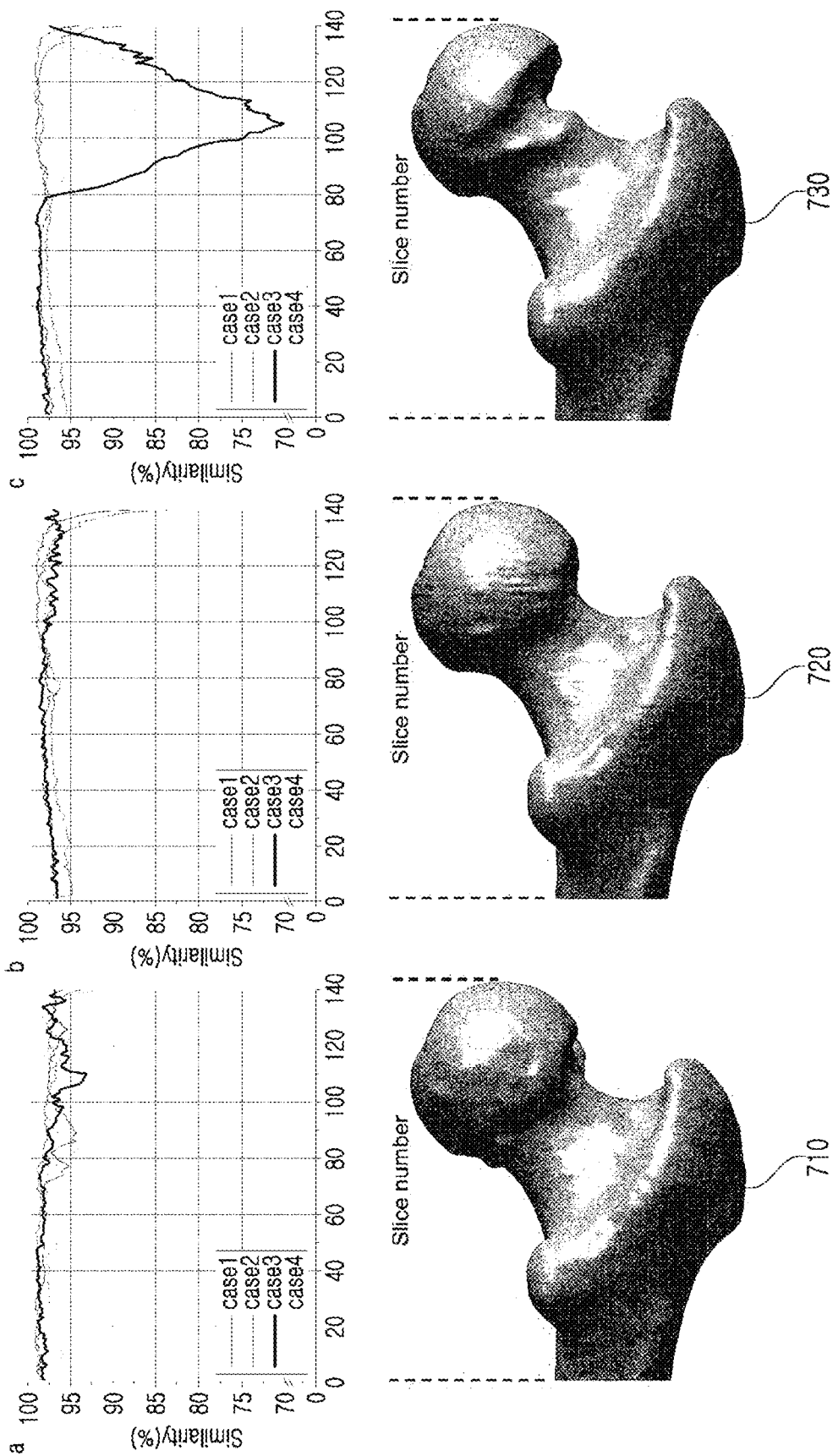
FIG. 7 is a diagram showing a comparison between the slice DOCs of segmented femur images in an embodiment of the present invention.

FIG. 7 is a diagram showing a comparison between the slice dice overlap coefficients (DOCs) of segmented femur images in an embodiment of the present invention.

In FIG. 7, in order to quantitatively evidence the effectiveness of the method of fully automatically segmenting an image according to an embodiment of the present invention, a DOC value 710 with a hip joint image (i.e., femur image) that has been manually sliced is compared with a Snake-based semi-automatically segment method 720 and a simplified-Kang (SK)-based automatically segment method 730 and shown.

710 may show a femur image sliced according to the method of fully automatically segmenting an image according to an embodiment of the present invention and a slice DOC. 720 may show a femur image sliced according to the Snake-based semi-automatically segment method and a slice DOC. 730 may show a femur image sliced according to the SK-based automatically segment method and slice DOCs. The DOC is a value quantitatively indicative of similarity between specific two images, and may be defined as DOC $(P_1, P_2) = 2|P_1 \cap P_2|/(|P_1|+|P_2|)$. In FIG. 7, for an accurate comparison, a global DOC (i.e., the calculation of a DOC for all of domains) and a slice DOC (i.e., the calculation of a DOC for each slice) have been calculated and compared. As the results of quantitative analysis, it could be seen that the method 710 according to an embodiment of the present invention has very higher accuracy than the SK-based automatically segment method 730. Furthermore, it could be seen that the method 710 has similar accuracy to the SK-based semi-automatically segment method 720.

Furthermore, it could be seen that the method 710 according to an embodiment of the present invention has very excellent accuracy than the SK-based automatically segment method 730 in the femoral head region.

Furthermore, it could be seen that in terms of the processing time, the method 710 according to an embodiment of the present invention has a processing speed 10 times faster than the SK-based semi-automatically segment method 720 and has similar processing speed to the SK-based automatically segment method 730.

Table 2 and Table 3 may show processing times taken to slice the femur images according to the three methods shown in FIG. 7 and the results of the processing of the global DOCs and the slice DOC.

TABLE 2

| | | | | | | Processing time (sec) | | |
|---|---|---|---|---|---|---|---|---|
| Case | Sex | Age (y) | Resolution (μm) | # of slices | Proposed method | Snake-based semi-automated segmentation | SK*-based automated segmentation | Manual Segmentation |
| 1 | Female | 43 | 600 × 600 × 625 | 177 | 171.0 | 1398.0 | 133.2 | 8781.6 |
| 2 | Female | 62 | 600 × 600 × 625 | 169 | 169.8 | 1470.6 | 132.6 | 9196.8 |
| 3 | Female | 30 | 700 × 700 × 625 | 211 | 211.8 | 2125.8 | 173.4 | 11713.8 |
| 4 | Female | 53 | 700 × 700 × 625 | 219 | 220.8 | 2364.0 | 188.4 | 12204.0 |
| | | Mean processing time | | | 193.4 | 1840.4 | 156.9 | 10474.1 |
| | | Mean processing time per slice | | | 1.00 ± 0.02 | 9.37 ± 1.13 | .080 ± 0.04 | 53.82 ± 2.48 |

TABLE 3

| | Global DOC (%) | | | Slice DOC (%) | | |
|---|---|---|---|---|---|---|
| Case | Proposed Method | Snake-based semi-automated segmentation | SK*-based automated segmentation | Proposed method | Snake-based semi-automated segmentation | SK*-based automated segmentation |
| 1 | 97.48 | 98.03 | 98.24 | 97.52 ± 1.18 | 97.78 ± 1.27 | 98.27 ± 0.64 |
| 2 | 98.16 | 97.24 | 97.72 | 98.19 ± 0.88 | 96.52 ± 1.82 | 97.39 ± 1.28 |
| 3 | 97.43 | 97.72 | 91.94 | 97.59 ± 1.26 | 97.51 ± 0.70 | 91.75 ± 9.04 |
| 4 | 97.01 | 98.13 | 95.38 | 97.09 ± 1.08 | 97.92 ± 0.73 | 95.38 ± 4.29 |
| Mean | 97.52 ± 0.41 | 95.82 ± 2.48 | 97.78 ± 0.34 | — | — | — |

Figure 8:
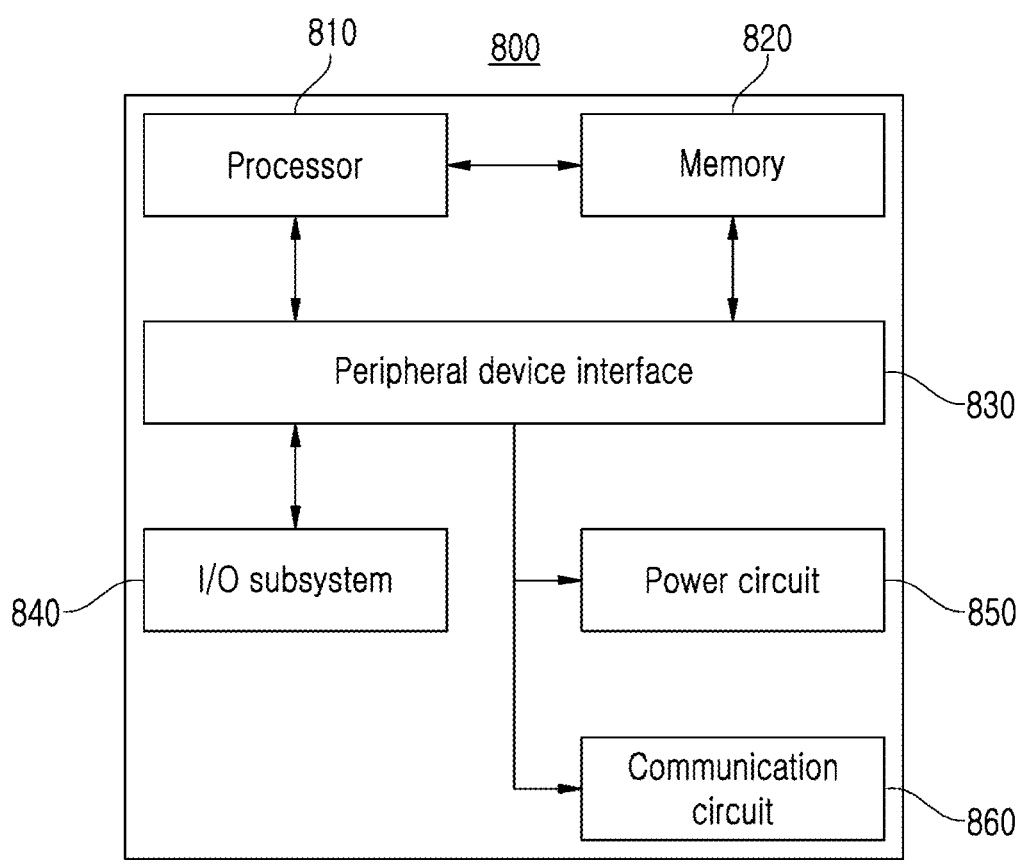
FIG. 8 is a block diagram for illustrating an example of the internal configuration of a computer system in an embodiment of the present invention.

FIG. 8 is a block diagram for illustrating an example of the internal configuration of a computer system in an embodiment of the present invention.

Referring to FIG. 8, the computer system 800 may include at least one processor 810, memory 820, a peripheral interface 830, an input/output (I/O) subsystem 840, a power circuit 850 and a communication circuit 860. In this case, the computer system 800 may correspond to a workstation.

The memory 820 may include high-speed random access memory, a magnetic disk, SRAM, DRAM, ROM, flash memory or non-volatile memory, for example. The memory 820 may include a software module, a command set or other various data necessary for the operation of the computer system 800. In this case, accessing, by other components, such as the processor 810 or the peripheral interface 830, the memory 820 may be controlled by the processor 820.

The peripheral interface 830 may couple the I/O peripheral devices of the computer system 800 to the processor 810 and the memory 820. The processor 810 may perform various functions for the computer system 800 and process data by executing the software module or command set stored in the memory 820.

The I/O subsystem 840 may couple various I/O peripheral devices to the peripheral interface 830. For example, the I/O subsystem 840 may include a controller for coupling a monitor, a keyboard, a mouse and a printer or other peripheral devices, such as a touch screen or sensors, if necessary, to the peripheral interface 830. In accordance with another aspect, the I/O peripheral devices may be coupled to the peripheral interface 830 without the intervention of the I/O subsystem 840.

The power circuit 850 may supply power to some or all of the components of a terminal. For example, the power circuit 850 may include a power management system, one or more power supplies such as a battery or AC power, a charging system, a power failure detection circuit, a power converter or an inverter, a power state indicator and/or specific other components for power generation, management and distribution.

The communication circuit 860 may enable communication with other computer systems using at least one external port. Alternatively, as described above, the communication circuit 860 may include an RF circuit and enable communication with other computer systems by transmitting/receiving a known RF signal also called an electromagnetic signal.

The embodiment of FIG. 8 is only an example of the computer system 800. The computer system 800 may omit some of the components shown in FIG. 8, may further include an additional component not shown in FIG. 8, or may have a configuration or arrangement in which two or more of the components are combined. For example, the computer system may further include a display in addition to the components of FIG. 8. Components that may be included in the computer system 800 may be implemented by hardware including an integrated circuit specified for one or more signal processing or applications, software or a combination of hardware and software.

In accordance with the present invention, accuracy and reliability can be improved and a processing time taken for image segmentation can be improved because an image of a joint is fully automatically segmented from a skeletal medial image using the unsupervised approaches, in particular, a mutual supplementation relation between the thresholding scheme and the watershed algorithm.

Furthermore, a cost limit to the supervised method can be overcome because image segmentation based on the unsupervised approach having a low initial cost is performed.

Furthermore, since region information of a hip joint is extracted by associating the thresholding method and the load path algorithm, region information of the hip joint can be extracted even without previously constructing data related to region information of bones forming the joint. That is, the region information of the hip joint can be extracted without a large amount of data.

Furthermore, in the case of the supervised approach, the accuracy and reliability of joint segmentation is dependent on a plurality of pieces of prior information (i.e., the amount and quality of the results of segmentation). In contrast, a plurality of joints can be segmented with high accuracy within a rapid time because region information of the hip joint can be extracted without a large amount of data. Furthermore, the present invention can contribute to the generation of a joint atlas map and the generation of statistical data.

Furthermore, a patient-specific hip joint finite element model (FEM) can be obtained based on a segmented image. That is, the present invention can contribute to operation for a fracture patient and arthritis patient and the fabrication of a personal artificial joint as primary results. Furthermore, a personal-specific joint state can be diagnosed based on quantitative bone strength assessment that is secondary results through association with finite element analysis.

The methods according to the embodiments of the present invention may be implemented in the form of program instructions executed through various computer systems and recorded on a computer-readable recording medium.

The apparatus described above may be implemented in the form of a combination of hardware components, software components, and/or hardware components and software components. For example, the apparatus and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. A processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may be aware that the processing device may include a plurality of processing elements and/or a plurality of types of processing elements. For example, the processing device may include a plurality of processors or a single processor and a single controller. Furthermore, other processing configuration, such as a parallel processor, is also possible.

Software may include a computer program, code, an instruction or one or more combinations of them and may configure the processing device so that it operates as desired or may instruct the processing device independently or collectively. Software may be distributed to computer systems connected over a network and may be stored or executed in a distributed manner. Software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may be known to those skilled in computer software. The computer-readable recording medium includes a hardware device specially configured to store and execute the program instruction, for example, magnetic media such as a hard disk, a floppy disk, and a magnetic tape, optical media such as CD-ROM or a DVD, magneto-optical media such as a floptical disk, ROM, RAM, or flash memory. Examples of the program instruction may include both machine-language code, such as code written by a compiler, and high-level language code executable by a computer using an interpreter. The hardware device may be configured in the form of one or more software modules for executing the operation of the embodiment, and the vice versa.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A method of fully automatically segmenting an image, the method comprising steps of:
    extracting region information corresponding to a target object to be segmented from a medical image of the target object by associating a thresholding method and a load path algorithm, wherein the medical image indicates a quantitative computed tomography (QCT), computed tomography (CT) or magnetic resonance imaging (MRI), and wherein the target object includes one or more bones;
    generating a first mask based on the extracted region information;
    generating a morphological patch by performing morphological subdivision on the medical image based on a watershed algorithm;
    generating a second mask based on the generated morphological patch; and
    segmenting an image corresponding to the target object from the medical image based on the first mask and the second mask, wherein the step of segmenting the image corresponding to the target object comprises segmenting the image corresponding to the target object from the medical image by merging the first mask corresponding to a regional patch and the second mask corresponding to the morphological patch.

2. The method of claim 1, wherein the step of extracting the region information corresponding to the target object comprises steps of:
    performing thresholding on the medical image based on a predetermined threshold;
    extracting a flag array related to the target object from an image on which the thresholding has been performed based on the load path algorithm; and
    generating a regional patch corresponding to the target object based on the extracted flag array.

3. The method of claim 2, wherein the step of performing the thresholding comprises steps of:
    setting the threshold used upon performing the thresholding as a design variable of a golden section method; and
    changing the threshold so that the threshold is relatively reduced according to the golden section method until predetermined convergence conditions are satisfied.

4. The method of claim 1, wherein the step of generating the morphological patch comprises generating the morphological patch on the medical image by performing preprocessing based on a middle value filter, dilation operation, and erosion operation.

5. The method of claim 1, wherein the step of generating the morphological patch comprises steps of:
removing noise from the medical image based on a middle value filter;
reinforcing a boundary of the image corresponding to the target object by performing dilation operation and erosion operation on an image from which the noise has been removed; and
performing morphological subdivision on the image whose boundary has been enhanced based on the watershed algorithm.

6. The method of claim 1, wherein the step of segmenting the image comprises automatically segmenting the image corresponding to the target object by selectively extracting a patch corresponding to the first mask from the second mask.

7. The method of claim 1, wherein:
the step of segmenting the image comprises segmenting an image corresponding to a hip joint from the QCT, CT or MRI image.

8. The method of claim 7, wherein the step of segmenting the image comprises segmenting images corresponding to different two bones forming the hip joint from the QCT, CT or MRI image.

9. A method of fully automatically segmenting an image, the method comprising steps of:
extracting region information corresponding to a target object to be segmented from a medical image of the target object by associating a thresholding method and a load path algorithm, wherein the medical image indicates a quantitative computed tomography (QCT), computed tomography (CT) or magnetic resonance imaging (MRI), wherein the target object includes one or more bones, and wherein the step of extracting the region information corresponding to the target object comprises steps of:
performing thresholding on the medical image based on a predetermined threshold;
extracting a flag array related to the target object from an image on which the thresholding has been performed based on the load path algorithm; and
generating a regional patch corresponding to the target object based on the extracted flag array;
generating a first mask based on the extracted region information;
generating a morphological patch by performing morphological subdivision on the medical image based on a watershed algorithm;
generating a second mask based on the generated morphological patch; and
segmenting an image corresponding to the target object from the medical image based on the first mask and the second mask.

10. The method of claim 9, wherein the step of segmenting the image corresponding to the target object comprises segmenting the image corresponding to the target object from the medical image by merging the first mask corresponding to a regional patch and the second mask corresponding to the morphological patch.

11. The method of claim 10, wherein the step of performing the thresholding comprises steps of:
setting the threshold used upon performing the thresholding as a design variable of a golden section method; and
changing the threshold so that the threshold is relatively reduced according to the golden section method until predetermined convergence conditions are satisfied.

12. The method of claim 9, wherein the step of generating the morphological patch comprises generating the morphological patch on the medical image by performing preprocessing based on a middle value filter, dilation operation, and erosion operation.

13. The method of claim 9, wherein the step of generating the morphological patch comprises steps of:
removing noise from the medical image based on a middle value filter;
reinforcing a boundary of the image corresponding to the target object by performing dilation operation and erosion operation on an image from which the noise has been removed; and
performing morphological subdivision on the image whose boundary has been enhanced based on the watershed algorithm.

14. The method of claim 9, wherein the step of segmenting the image comprises automatically segmenting the image corresponding to the target object by selectively extracting a patch corresponding to the first mask from the second mask.

15. The method of claim 9, wherein:
the step of segmenting the image comprises segmenting an image corresponding to a hip joint from the QCT, CT or MRI image.

16. The method of claim 15, wherein the step of segmenting the image comprises segmenting images corresponding to different two bones forming the hip joint from the QCT, CT or MRI image.

17. A method of fully automatically segmenting an image, the method comprising steps of:
extracting region information corresponding to a target object to be segmented from a medical image of the target object by associating a thresholding method and a load path algorithm, wherein the medical image indicates a quantitative computed tomography (QCT), computed tomography (CT) or magnetic resonance imaging (MRI), and wherein the target object includes one or more bones;
generating a first mask based on the extracted region information;
generating a morphological patch by performing morphological subdivision on the medical image based on a watershed algorithm, wherein the step of generating the morphological patch comprises steps of:
removing noise from the medical image based on a middle value filter;
reinforcing a boundary of the image corresponding to the target object by performing dilation operation and erosion operation on an image from which the noise has been removed; and
performing morphological subdivision on the image whose boundary has been enhanced based on the watershed algorithm;
generating a second mask based on the generated morphological patch; and
segmenting an image corresponding to the target object from the medical image based on the first mask and the second mask.

18. The method of claim 17, wherein the step of segmenting the image corresponding to the target object comprises segmenting the image corresponding to the target object from the medical image by merging the first mask corresponding to a regional patch and the second mask corresponding to the morphological patch.

19. The method of claim 17, wherein the step of extracting the region information corresponding to the target object comprises steps of:
   performing thresholding on the medical image based on a predetermined threshold;
   extracting a flag array related to the target object from an image on which the thresholding has been performed based on the load path algorithm; and
   generating a regional patch corresponding to the target object based on the extracted flag array.

20. The method of claim 19, wherein the step of performing the thresholding comprises steps of:
   setting the threshold used upon performing the thresholding as a design variable of a golden section method; and
   changing the threshold so that the threshold is relatively reduced according to the golden section method until predetermined convergence conditions are satisfied.

21. The method of claim 17, wherein the step of generating the morphological patch comprises generating the morphological patch on the medical image by performing preprocessing based on a middle value filter, dilation operation, and erosion operation.

22. The method of claim 17, wherein the step of segmenting the image comprises automatically segmenting the image corresponding to the target object by selectively extracting a patch corresponding to the first mask from the second mask.

23. The method of claim 17, wherein:
   the step of segmenting the image comprises segmenting an image corresponding to a hip joint from the QCT, CT or MRI image.

24. The method of claim 23, wherein the step of segmenting the image comprises segmenting images corresponding to different two bones forming the hip joint from the QCT, CT or MRI image.

\* \* \* \* \*